Sept. 21, 1971 L. F. REMINGTON 3,606,824
PRESS AND CONVEYOR WITH SELF-STRIPPING DIE
Filed May 2, 1969 8 Sheets-Sheet 5
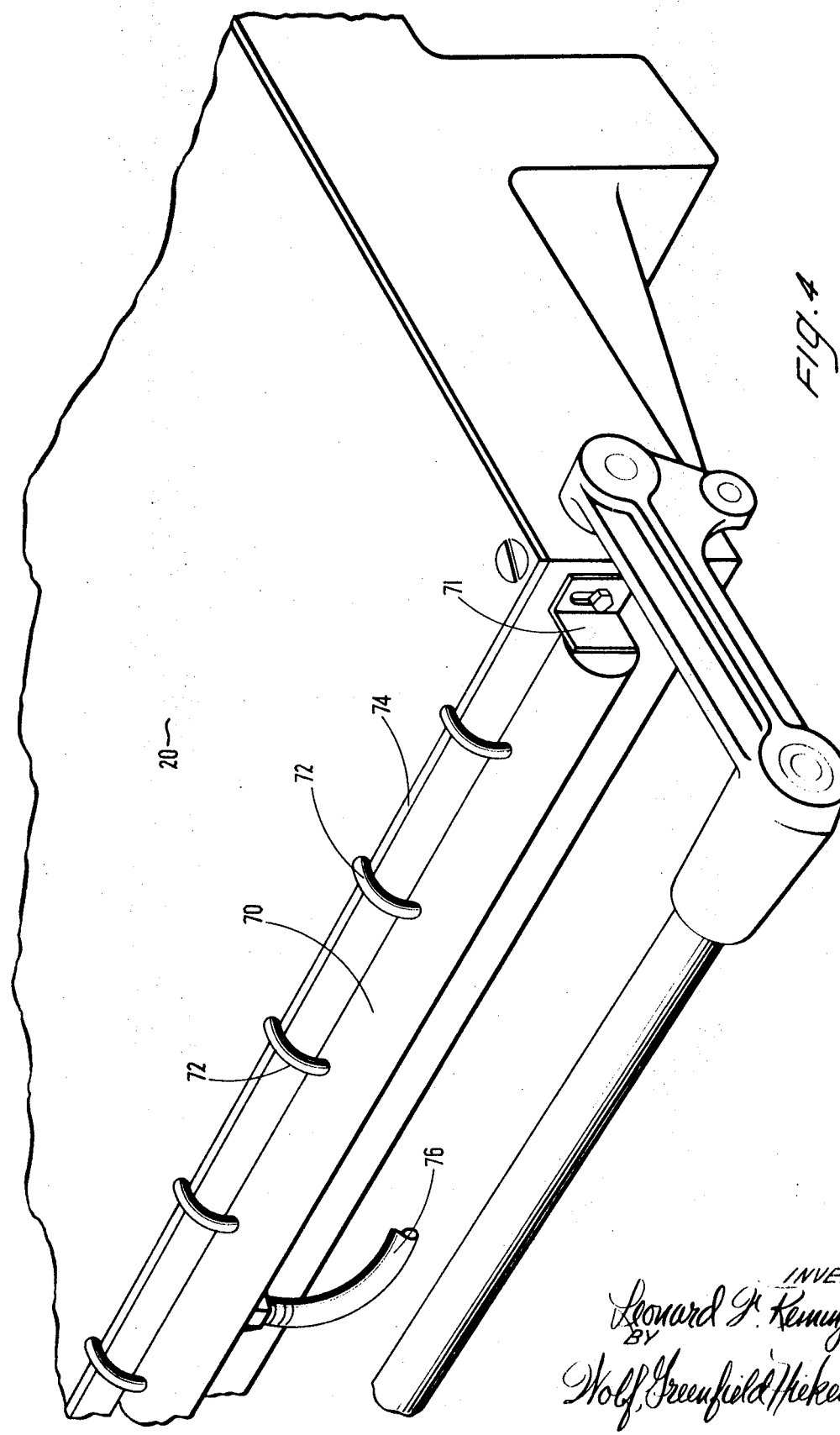

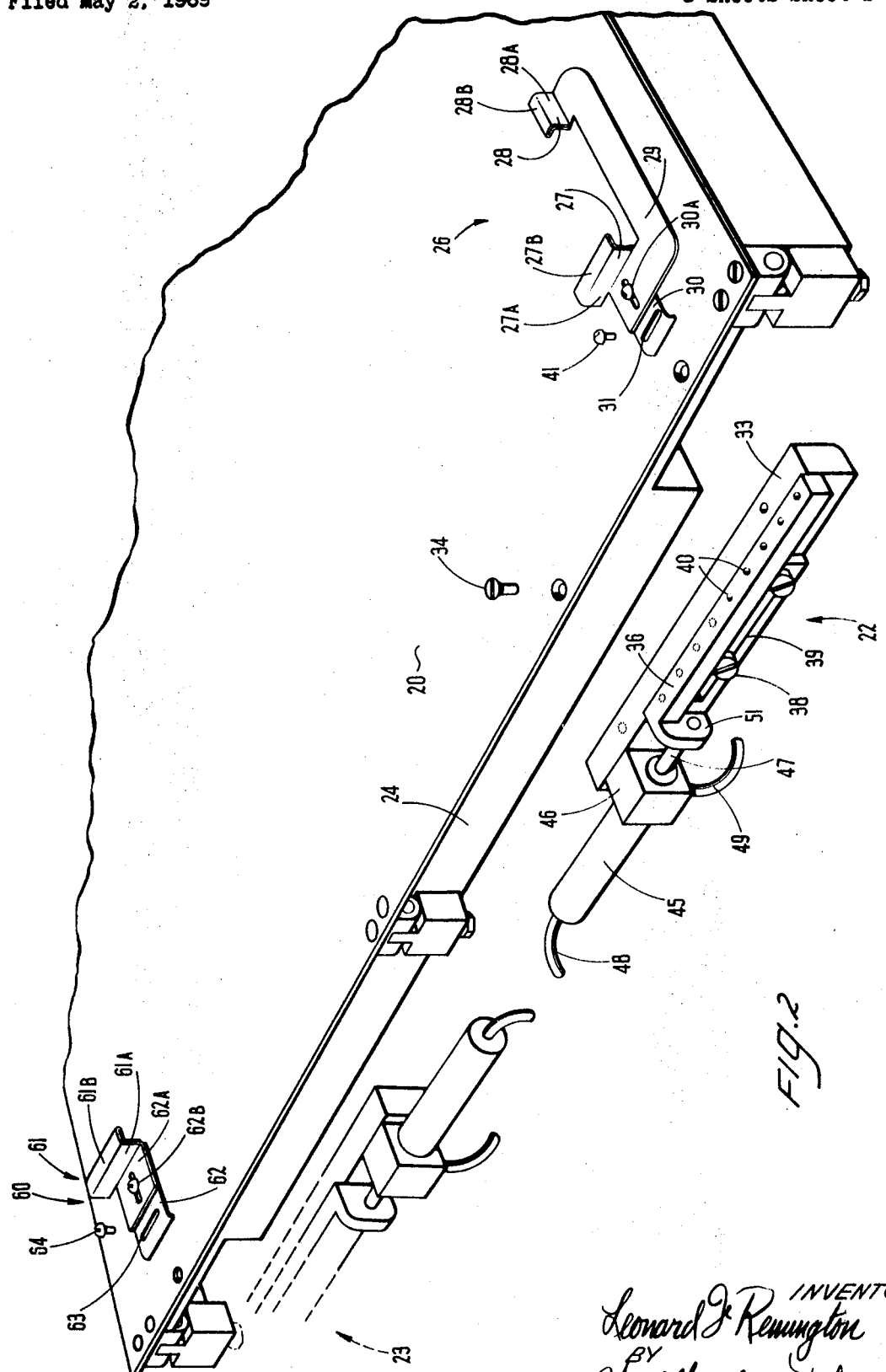

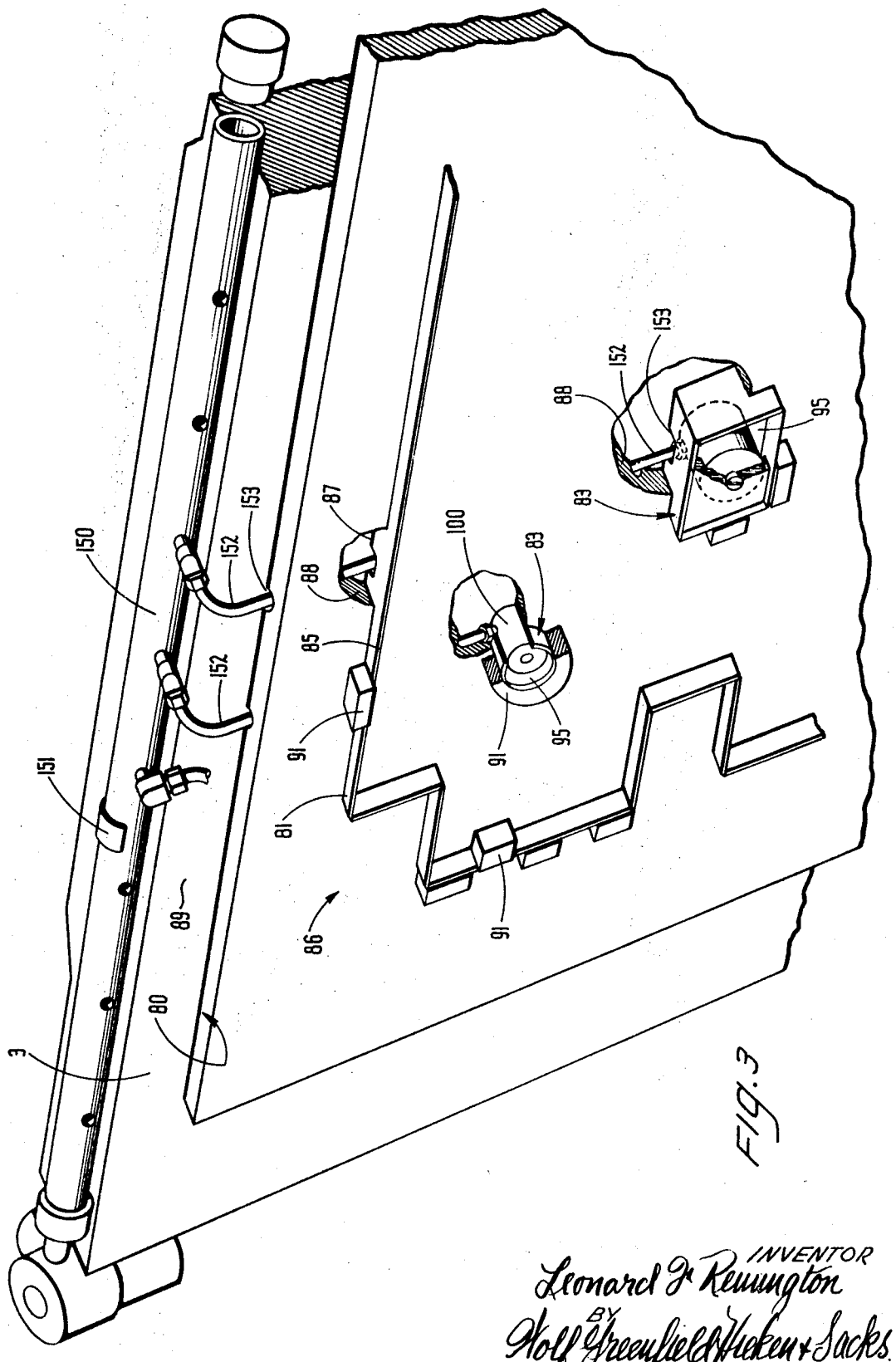

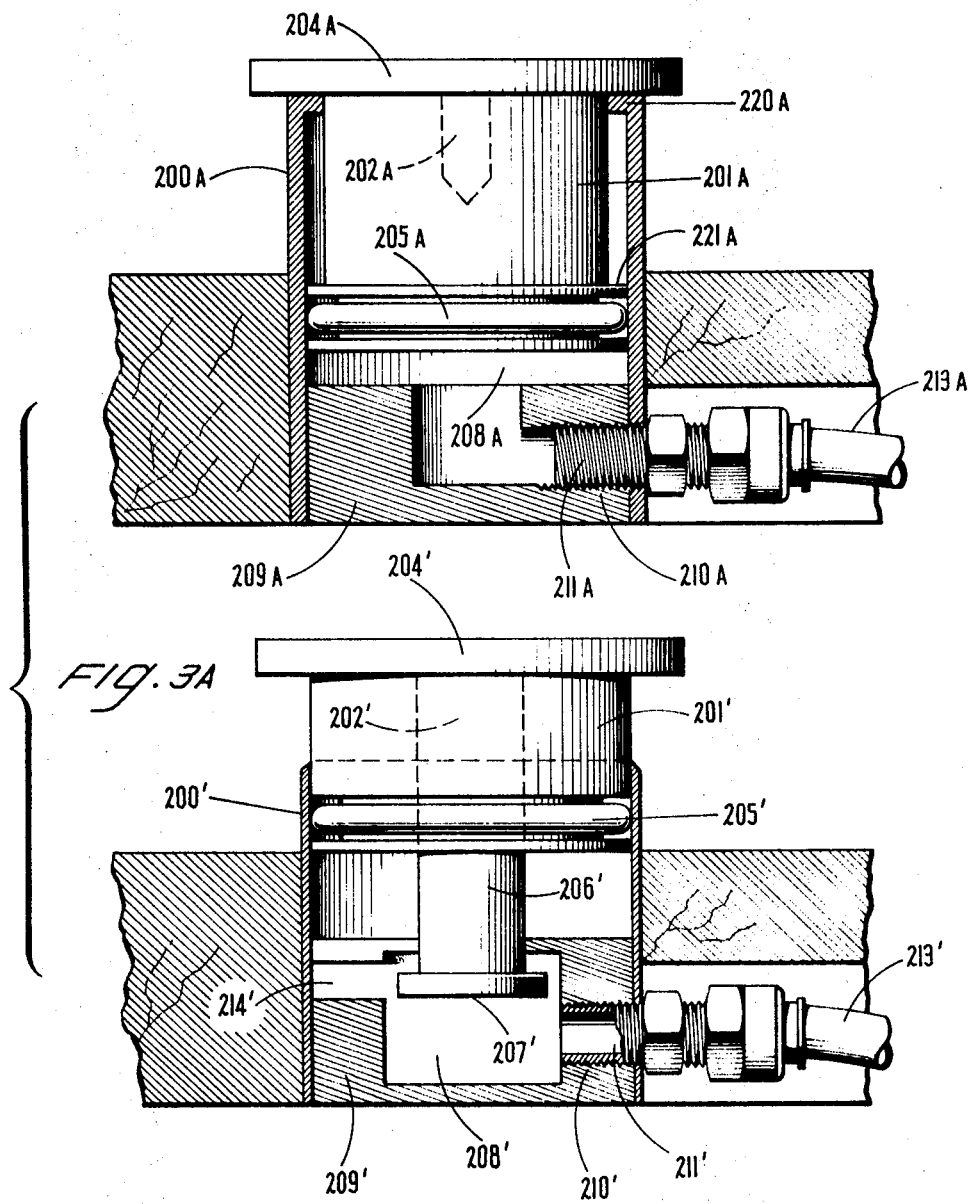

Sept. 21, 1971 L. F. REMINGTON 3,606,824
PRESS AND CONVEYOR WITH SELF-STRIPPING DIE
Filed May 2, 1969 8 Sheets-Sheet 6

United States Patent Office 3,606,824
Patented Sept. 21, 1971

3,606,824
PRESS AND CONVEYOR WITH SELF-STRIPPING DIE
Leonard F. Remington, Franklin, Mass., assignor to Thomson National Press Company, Franklin, Mass.
Filed May 2, 1969, Ser. No. 822,858
Int. Cl. B31b 1/14
U.S. Cl. 93—58R   32 Claims

ABSTRACT OF THE DISCLOSURE

A cutting and creasing press having a frame supporting a cutting and creasing die and a platen for pressing a workpiece against the die. Means are provided for removing waste from the cutting and creasing die after the workpiece is removed from the cutting and creasing die to effectively separate waste from the workpiece. A conveyor system having a series of beaters provides a means for easily separating the die cut and creased workpieces from the waste material.

SUBJECT MATTER OF INVENTION

The present invention relates to a cutting and creasing press having a self-stripping die means and improved waste collection means.

BACKGROUND OF INVENTION

Conventional cutting and creasing presses ordinarily use steel rule dies or the like having the workpiece supported on a platen and removed from the rule by the resilient action of rubber stripping members. Many workpieces that are processed in such equipment are often designed to be formed with cut-outs. Heretofore, when the workpiece is ejected from the steel rule die by the strippnig rubber, the cut-out is also simultaneously ejected. Because of this simultaneous ejection, the cut-out or waste is reinserted in the workpiece as the workpiece is removed from the press. As a consequence, elaborate mechanisms have been devised to subsequently remove the unwanted cut-outs from the die-cut workpieces in a subsequent handling step. These means are cumbersome and often involve loss of efficiency and other problems. Further, with the mechanisms heretofore available, other problems have arisen with respect to separating the cut-outs or waste from the die-cut workpieces.

SUMMARY OF INVENTION

It is therefore an object of the present invention to overcome limitations set forth above. In this connection, it is an object of the present invention to provide an improved means for stripping cut-outs or waste from die-cut material while still in the cutting and creasing press between the platen and frame. A further object of the present invention is to provide an improved means for ejecting both waste and workpieces from the cutting die and platen. Another object of the present invention is to provide an improved means method of supporting and securing a workpiece on a platen for impressing by a self-stripping die. A further object of the present invention is to provide an improved means for removing a workpiece from a platen and subsequent to impression on the cutting die. A still further object of the present invention is to provide an improved means method of conveying a workpiece from a cutting and creasing die to a conveyor for removing and separating waste from the die-cut material. One further object of the present invention is to provide a means for sequentially removing a workpiece and waste material from a cutting and creasing press. One more object of this invention is to provide an improved means method of aligning a workpiece while in a press for feeding to a conveyor system designed to remove the die-cut workpiece. A further object of the present invention is to provide an improved conveyor means for receiving and conveying die-cut material and waste, wherein die-cut material and waste is effectively separated by a series of beater means longitudinally aligned with the path of the die-cut workpiece. It is also an object of the present invention to provide an improved press in which sheets for cutting or creasing may be fed to the machine by workers with comparatively little skill at a rate comparable to the speed of skilled workers on machines heretofore available. A further object of the present invention is to provide an improved cutting and creasing press wherein removal of the workpiece and waste material is automatically effected without the need of an operator's attention. A further object of the present invention is to provide an improved press in which inside and outside waste may be selectively removed.

In the present invention there is provided a cutting and creasing press having a frame for supporting a cutting die and a platen for pressing a work piece against the die. Means for automatically stripping an impaled workpiece from the die sequentially with respect to the stripping of waste from the die with such means including ejectors for engagement with the waste and controlled ejection thereof. Conveyor means are also provided for receiving impressed and die-cut workpieces and thereafter removing any remaining attached waste as the workpiece is conveyed from the machine.

BRIEF DESCRIPTION OF DRAWINGS

The foregoing objects and advantages to the present invention will be more clearly understood when considered in conjunction with the accompanying drawings in which:

FIG. 2 is a fragmentary perspective view illustrating guide means at the bottom of the platen;

FIG. 3 is a fragmentary perspective of the frame and associated mechanism including a typical cutting die;

FIG. 3A is a cross sectional elevation of typical ejector means;

FIG. 4 is a fragmentary perspective view of the upper end of the platen;

DETAILED DESCRIPTION OF PREFERRED EMBODIMENT

Figure 1:
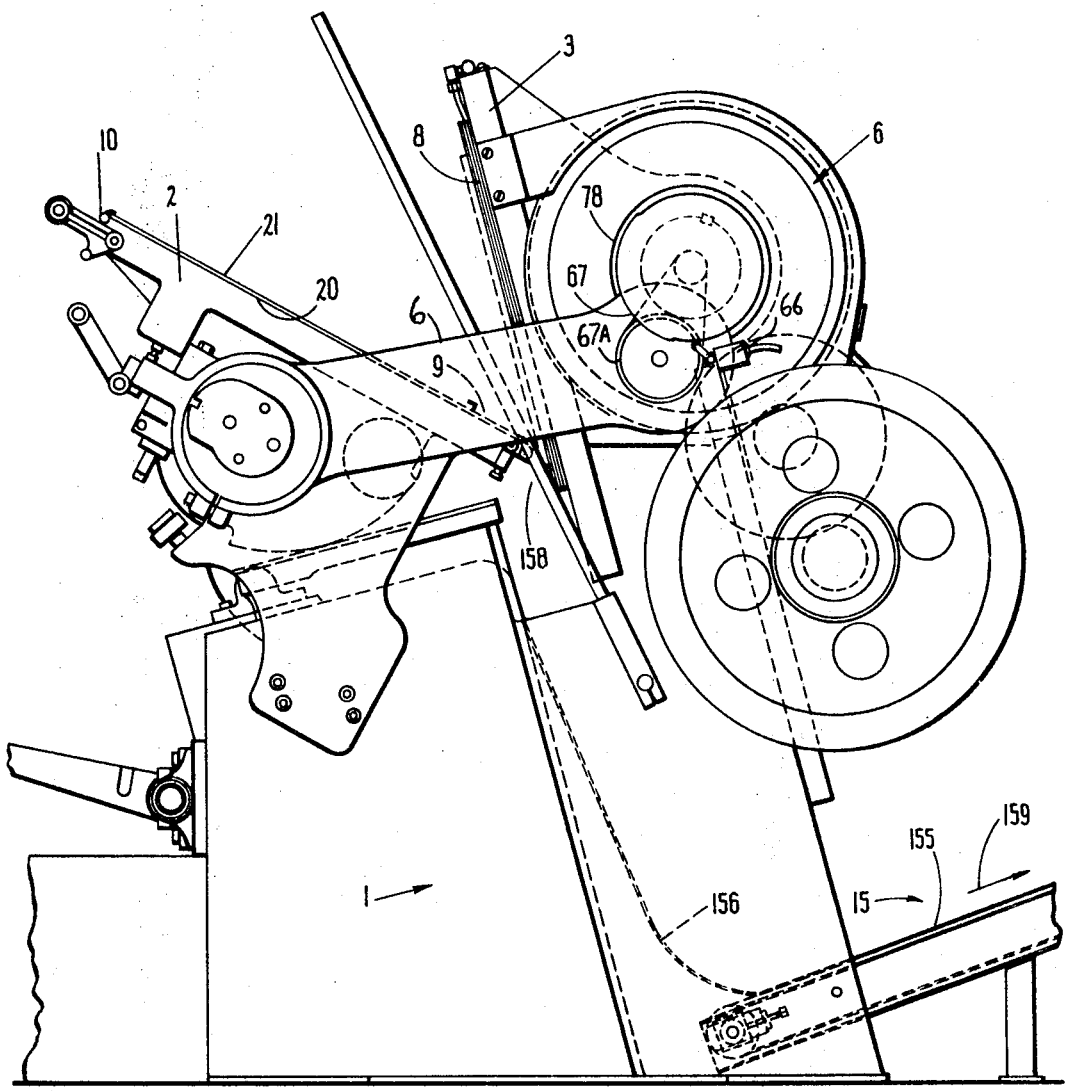
FIG. 1 is a side elevational view of a cutting and creasing press embodying the present invention.

Referring to FIG. 1, there is illustrated a cutting and creasing press which to the extent not described herein may comprise a conventional cutting and creasing press, including for example the types of presses made by the Thomson National Press Company of Franklin, Mass. In this arrangement, there is provided a support 1 upon which a platen 2 is supported for rolling or rocking movement to and away from a cutting position relative to a die supported on the face of frame 3. The platen 2 is rocked or rolled to and from this cutting relation by a standard drive and linkage arrangement 6. A cutting die 8 of special design is supported on the face of the frame 3 by suitable means and is provided with means hereafter described for automatically self-stripping waste from a die-cut workpiece. A guide means 9, more fully described hereafter, is provided at the lower end of the platen 2 for supporting workpieces as the platen moves towards the cutting die and which upon engagement of the workpiece with the cutting die are withdrawn from interfering relation with the platen and cutting die thereby allowing the workpiece to be impressed and drop freely after impression. Means 10 are provided at the upper end of the platen for assisting in the removal of the workpiece from the platen after its impression on the cutting die. A conveyor system 15 is provided for receiving the successively cut workpieces and conveying them under a series of beater means hereafter described for removing any waste that may have attached itself to the workpieces and for collecting the waste in a common collection means.

The platen 2 has a surface 20 upon which a workpiece 21 is secured. The workpiece is secured in position by the adjustable guide means generally illustrated at 9 in FIG. 1, and illustrated in specific detail in FIG. 2. A pair of guide means 22 and 23 are secured at the lower edge 24 of the platen. At least one of these guide means, as for example 22, is designed to engage and secure a bottom and side edges of the workpiece. The guide member 26 consists preferably of an angular member having a bottom guide 27 and side guide 28. The bottom and side guides 27 and 28 comprise angle members having one leg 27A and 28A extending normal to the surface 20 and with the angular legs 27B and 28B extending parallel to the surface 20. These guides 27 and 28 are adapted to engage the corner of a workpiece with the legs 27B and 28B overlying the surface of the workpiece. The guides 27 and 28 are integrally interconnected by a web 29. A tab 30 is positioned below the web 29 and is adjustably connected to it by a screw 30A extending through parallel slots in the web 29 and tab 30 thereby providing a means for vertically adjusting the guide member 26. The tab 30 has a slot 31. A bracket 33 is suitably secured to the lower edge of the platen, as for example by plurality of screws 34 extending down through the platen surface 20 into the bracket 33. An adjustable frame 36 is slidably secured to the bracket 33 by suitable means which may comprise for example a pair of loosely engaged bolts 38 having enlarged heads extending loosely through a slot 39 extending longitudinally of the frame 36. The upper portion of the frame 36 is provided with a series of threaded holes 40. The guide member 26 may be adjustably secured to this adjustable frame 36 by a screw 41 that extends through slot 31 selectively into one of the holes 40. Thus, guide member 26 may be laterally adjusted for a given workpiece by simply changing the hole 40 in which screw 41 is secured thereby adjusting the position of the guide member 26 on the frame 36. Also secured to the bracket 33 is an air cylinder 45 with the air cylinder suitably secured to a supporting block 46 in turn screwed to the bracket 33. The air cylinder 45 may be of conventional design and provided with dual ports to which are connected tubes 48 and 49 for selective admission of air pressure to the cylinder on either side of its piston whereby the piston shaft may be selectively reciprocated. The output shaft 47 of the air cylinder extends through the block 46 and is anchored to a flange 51 integrally formed at one end of the adjustable frame 36. Actuation of the air cylinder 45 thus may be used to reciprocate the frame 36 and consequently guide member 26 laterally with respect to the lower edge of the platen surface 20.

The giude means 23 at the other end of the platen is constructed in a similar fashion, except the guide member 60 is formed with a bottom guide 61 only and not a side guide. The bottom guide 61 may comprise a bottom leg 61A and upper leg 61B. A tab 62A integral and normal to leg 61A is adjustably connected to web 62 by a screw 62B that extends through parallel slots, thereby providing means for vertical adjustment of the guide means. Web 62 has a slot through which a bolt 64 is adapted to selectively engage the guide member 61 with the adjustable frame 36. The air tubes 48 and 49 are connected to a conventional source of air pressure through a conventional valve mechanism not shown. The valve mechanism controlling air to the air cylinder 45 is in turn controlled by a suitable switch means supported for selectively timed actuation depending upon the position of the platen with respect to the frame. Such actuating means may comprise a microswitch 66 (FIG. 1) supported on the machine for sequential tripping by a cam 67 that is keyed to a crank pin arm 67A in turn connected to the gear wheel crank pin of the gear wheel carried by the main drive shaft of the machine.

Means are provided for assisting in the removal of the workpiece from engagement with the platen after the workpiece has been impaled or impressed on the cutting die and the platen is moving from a position close to the cutting die. This arrangement generally illustrated at 10 in FIG. 1 and in detail in FIG. 4 consists primarily of an air manifold 70 to the upper edge of the platen 2. Extending from the air manifold 70 are a plurality of air outlet tubes 72 that curl over the edge 74 of the platen and are directed downwardly and against the surface 20 of the platen. Air from the manifold 70 passing through the tubes 72 tends to flutter a workpiece that sticks to the surface 20 away from the surface. Air is supplied to the manifold 70 through a tube 76 that is connected to a suitable air source through a control valve not shown. The control valve for air passing through the tube 76 may in turn be suitably controlled, as for example by a microswitch controlling the valve. Such a microswitch may be supported adjacent microswitch 66 for engagement by another cam 78 also supported as cam 67.

The cutting die assembly generally illustrated at 8 in FIG. 1 is best illustrated in FIG. 3. In this arrangement, there is provided a base 80. This base 80 may be made of any material conventionally used for a steel rule cutting die. Preferably, it is formed of wood. Cutting means are secured to the base. These cutting means may preferably comprise conventional steel rule cutting dies 81. At least one, and as illustrated in most embodiments a plurality, of the cutting rules is shaped and positioned to sever segments of a workpiece impaled or impressed on the cutting die from the main portion of the workpiece. Such means as illustrated at 83 may be designed to cut any one of a number of different shapes from the main portion of the workpiece.

The steel rules forming dies 81 may be of conventional design and may be secured in the base 80 in a conventional manner. Thus side face or center face rules may be used. The dies 83 which bond the locations of the ejectors preferably have a side face bevel. In such an arrangement, the rules are formed of lengths of steel having one edge 85 ground by beveling to form a side face bevel with this edge 85 projecting beyond and spaced above one major surface 86 of the base 80. It is important for maximum efficiency to form the bevel of the side face bevel on the outside of the continuous portions of the rule 83 whereby severed segments will be retained within the portions of rule 83 until positively ejected by the ejection mechanism. The rule 83 is continuous and forms enclosing elements adapted to sever segments of a workpiece impaled or impressed on the die. The other edges 87 of the rules forming dies 81 and 83 extend preferably to the other major surface 88 of the base 80 and are secured against the face 89 of the frame. The base 80 may be conventionally secured by suitable means to this face 89.

Means are provided for effecting a force on the major portion of the workpiece after it has been impaled or impressed on the die. These means may conventionally take the form of stripping rubbers 91, which are compressable resilient members that normally project outwardly from the surface 86 to or beyond the level of the edges 85. These stripping members 91 are preferably positioned on those sides of those portions of the rule 81 that define the major portion of the workpiece. In the portions 83 of the rule, the enclosed areas 95 defined by the periphery of the rule are devoid of these stripping members 91. The stripping members 91 are designed to compress upon impalement or impresion of a workpiece on the rules 81. Upon release of the force exerted by the closing platen when it reaches its maximum closure position and upon the return movement of the platen to its original open position, the stripping members 91 expand and force the major portions of the workpiece from engagement with the rule 81. The stripping members 91 surrounding the portions of rule 83 of the rule may be annular in configuration.

Positioned within the continuous rule 83 is a means for sequentially ejecting segmented portions of the workpiece from the cutting die assembly in synchronized relation to the ejection or movement of the workpiece from the base 80 in response to forces effected by the stripping members 91.

The ejection mechanism 100 is best illustrated in FIGS. 3 and 3A. As illustrated, the ejector includes a cylindrical casing 200' contained within the rule 83. This casing is suitably secured within the base. One end of the casing 200' projects to one surface of the base while the other end projects to the other surface of the base. Contained within the cylinder 200' is a piston 201' having a tapped axial hole 202' designed to receive the threaded shank of a member 204 that is adapted to be engaged by the segment of the workpiece being cut. The piston 201' is provided with an annular groove within which an O-ring 205' is positioned. This O-ring 205' bears against the inner surface of the casing 200' to form a fluid or air tight seal. A shaft 206' connected to the piston has an outwardly flared flange 207' at its other end. This flange 207' is axially slidable in an axial slot 208' in bottom plug 209'. The bottom plug 209' is provided with a lateral opening 210' continuous with the axial opening 208'. A male threaded tube 211' is threaded into the tapped hole 210' and is designed to have a tubing 213' interconnecting the ejector and a suitable air pressure source.

If desired, the hole 208' may be formed by first forming a radially extending slot 214' with an undercut. The piston 201', shaft 206' and member 209' may be pre-assembled by laterally sliding the flange 208' through the slot 214' and thence axially downwardly before this pre-assembled arrangement is inserted in casing 200'.

An alternate form of an ejector means is shown on the left in FIG. 3A. This means is simpler to manufacture than the ejector means shown in the right of FIG. 3A. In this arrangement the casing 200A is suitably secured in the base. One end of the casing 200A projects to one surface of the base, while the other end projects to the other surface of the base. Contained within the cylinder 200A is a piston 201A having a tapped axial hole 202A designed to receive the threaded shank of a member 204A that is adapted to be engaged by the segment of the workpiece being cut. The piston 201A is provided with an annular groove within which an O-ring 205A is positioned. The O-ring 205A is located at the lower end of the piston in an area that extends radially to the inner surface of the casing 200A. The portion of the piston 201A above the portion within which the O-ring is located is of narrow diameter and has a sliding fit with inwardly extending lip 220A at the upper end of casing 200A. The O-ring 205A forms a fluid or air tight seal.

The shoulder 221A engages the inwardly extending lip 220A in upward movement of the piston to limit the upward movement of the piston to a desired stroke. A bottom plug 209A is provided with a lateral opening 210A continuous with the opening 208A. A male threaded tube 211A is threaded into the tapped hole 210A and is designed to have a tubing 213' interconnecting the ejector and a suitable air pressure source.

The ejector mechanism is supplied by air from an air manifold 150. This manifold is suitably secured to the upper edge of the frame 3 by suitable means, for example as brackets 151. A plurality of tubes 152 are suitably connected to the manifold and extend over the face 89 of the frame through suitably provided slots 153 in the face 88 of the base 80 and in the rules so that these tubes 152 are flush with this surface 88. The ends of these tubes 152 are suitably connected to the ejector cylinders.

In a typical cutting die, a four-point side steel rule is used. The portion 83 of the rule which is designed to sever a waste piece from the workpiece is surrounded by a rubber resilient ejecting means. The rule is beveled on its outer side. The outer portions of the die are provided with the series of rules radiating to the edge of the workpiece so that the outside waste is cut up into relatively small pieces, preferably for example no more than three inches in any dimension.

Figure 5:
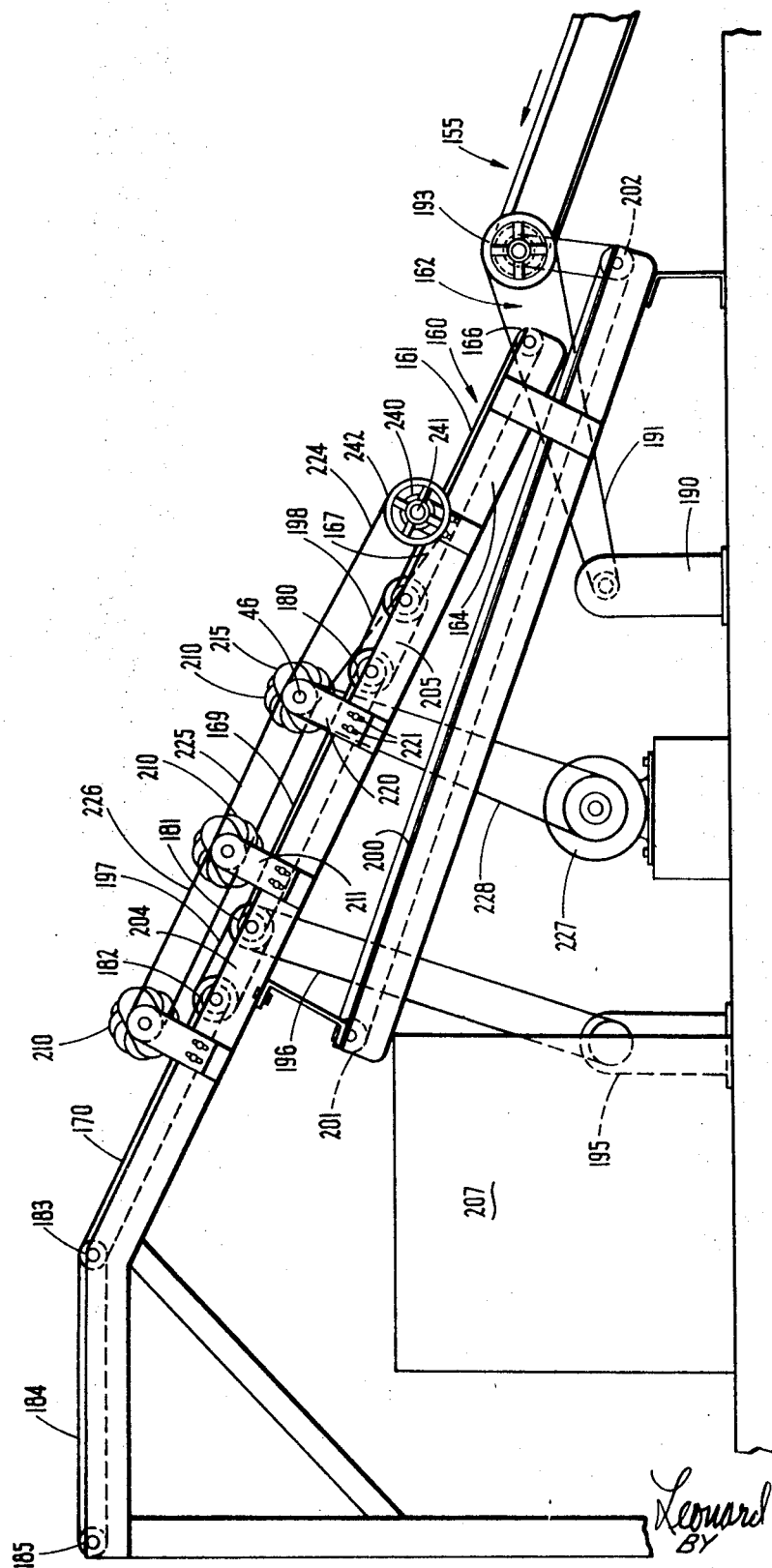
FIG. 5 is an elevational view of the conveyor system, a part of which is only shown in FIG. 1, looking from the side of the machine opposite to that illustrated in FIG. 1.
Figure 6:
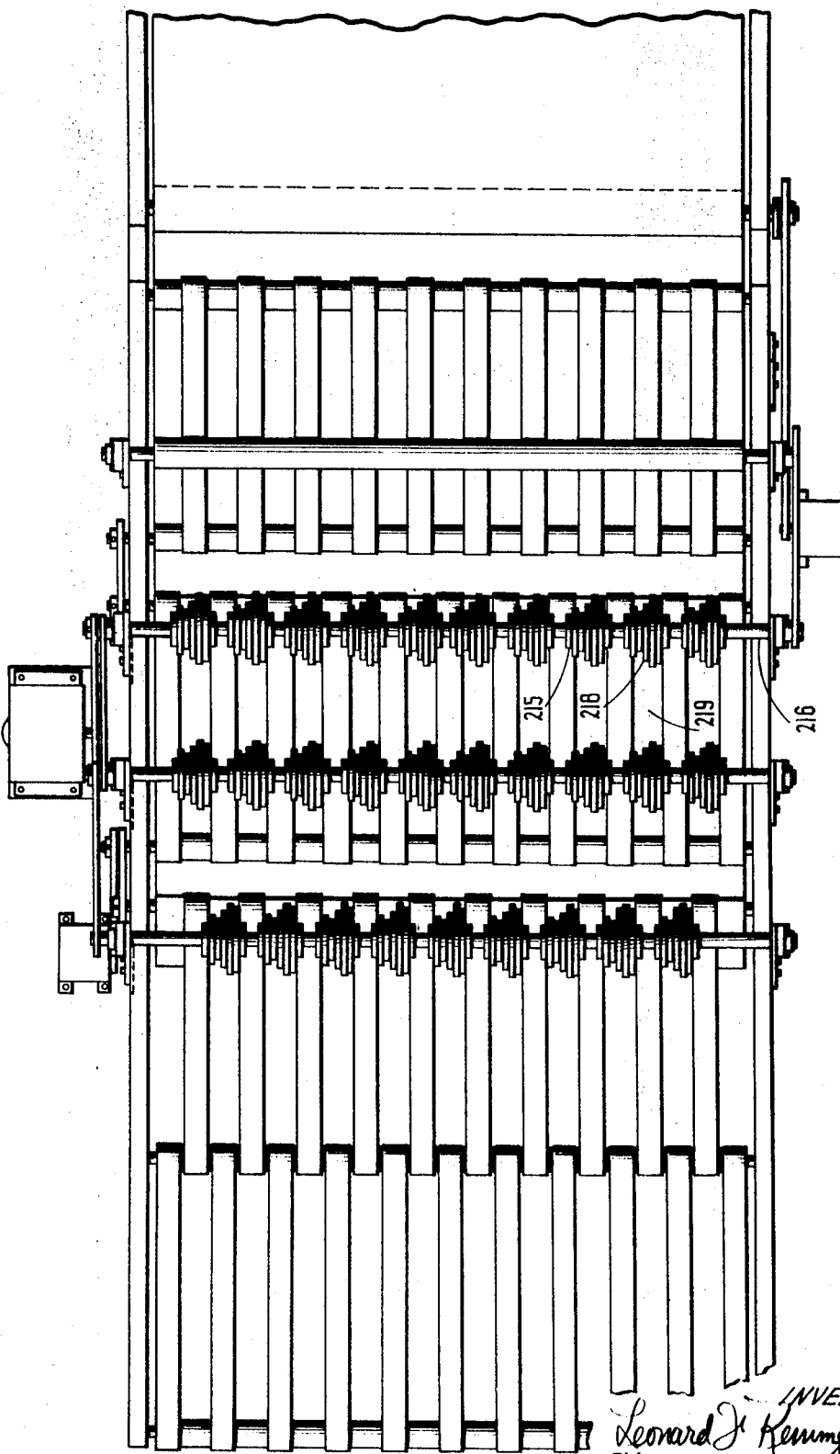
FIG. 6 is a top plan view of the portion of the conveyor system as shown in FIG. 5.

The conveyor mechanism for receiving the die-cut sheets from between the frame and platen is best illustrated in FIGS. 5 and 6. In this arrangement the conveyor means 15 is positioned with a plurality of endless belts comprising a first section 155 with one end at the bottom of a guide chute 156 (FIG. 1). The guide chute extends downwardly from a position below the space defined by the lower edge of the platen and frame. Die-cut workpieces thus slide between these elements in space 158 sequentially with the severed waste. The workpieces are successively engaged by the endless belts of the first section 155 and are carried in the direction of arrow 159. The belts in the first section are inclined upwardly to a second section 160. The first section 155 is spaced from the conveyor belts 161 of the second section 160 by a distance normally greater than the maximum width of waste that is being cut by the press. Ordinarily, this would be approximately three inches with this space illustrated at 162. The belts 161 are suitably supported on a frame 164 with the belt providing an upwardly incline moving surface. These belts 161 are suitably supported for movement on the rolls 166 and 167, respectively at the lower and upper ends. A third set of belts 169 and a fourth set of belts 170 are also supported on the frame 166, respectively by sets of rolls 180, 181, 182 and 183. A final set of belts 194 is supported for rotation by roll 183 and roll 185. The belts 161 are mis-aligned longitudinally with the belts 169. The belts 169 in turn are mis-aligned with the belts 170, and the belts 170 are mis-aligned with the belts 184. Such mis-alignment is attained by laterally displacing each set or sections of belts from the next adjacent set or sections as illustrated in FIG. 6. The belts are commonly driven by a motor source 190 suitably connected to the drive rolls, as for example by a chain drive 191 connected to a sprocket wheel 193 on the upper rolls supporting belts 155. A second motor 195 may drive belts 161, 169, 170 and 185 through an endless chain 196 connected to this sprocket-mounted shaft of motor 195 at one end and to a sprocket connected to the shaft of roll 181. A chain 197 operatively interconnects the sprockets on the shafts of rolls 181 and 182 while a chain 198 operatively connects the sprockets supported on the shafts on rolls 180 and 167.

An elongated belt 200 preferably extending the width of the conveyor is supported for movement in an inclined plane below frame 146 by upper roll 201 and lower 202 at opposite ends of the belt. This single full width belt 200 is designed to receive waste material that falls between the adjacent edges of adjacent belts 161, 169 and 170 or between the adjacent ends of the successive ends of belts in the spaces 204, 205 and 162. A suitable receptacle 207 is provided to receive waste as it is carried up the incline belt 200 to its upper end.

A plurality of beater means 210 are supported by brackets 211 above the belts 169 and 170. Each of these three sets of beater means 210 consists of a plurality of beater elements 215 mounted on shaft 216. The elements 215 are non-circular in configuration with a maximum radius from the supporting shaft adapted to engage a workpiece or waste material carried on the belt below and are adjustable to partially project below the upper surfaces of the belts. The elements 215 are arranged in plurality of groups, as illustrated in FIG. 6 with each group 218 aligned vertically over a space 219 between adjacent belts. The individual elements 215 are arranged so that their maximum radii are radially staggered. On rotation of the shafts 216, different elements 215 in each group 218 will engage a workpiece or waste material carried below at different times. The shafts 216 are suitably journaled at their ends in frames 220, which may be adjustable, as for example by bolts 221 through slots in the frame. The shafts 216 support sprockets which in turn engage chains 224, 225 and 226 for common rotation through a drive source, as for example motor 227, which engages the sprocket on one shaft through a chain 228. A feed roll 240 supported on 241 is positioned above belts 161 and may be driven through pulley 242. The purpose of these beaters is to remove all waste not removed by the ejectors.

While the preferred embodiment describes the portions removed by rules 83 as waste and the balance as the workpiece, it should be understood that in some applications the severed segments removed by the rules 83 are in fact the useful portions of the material and the balance herein referred to as the workpiece is actually waste material.

Figure 7:
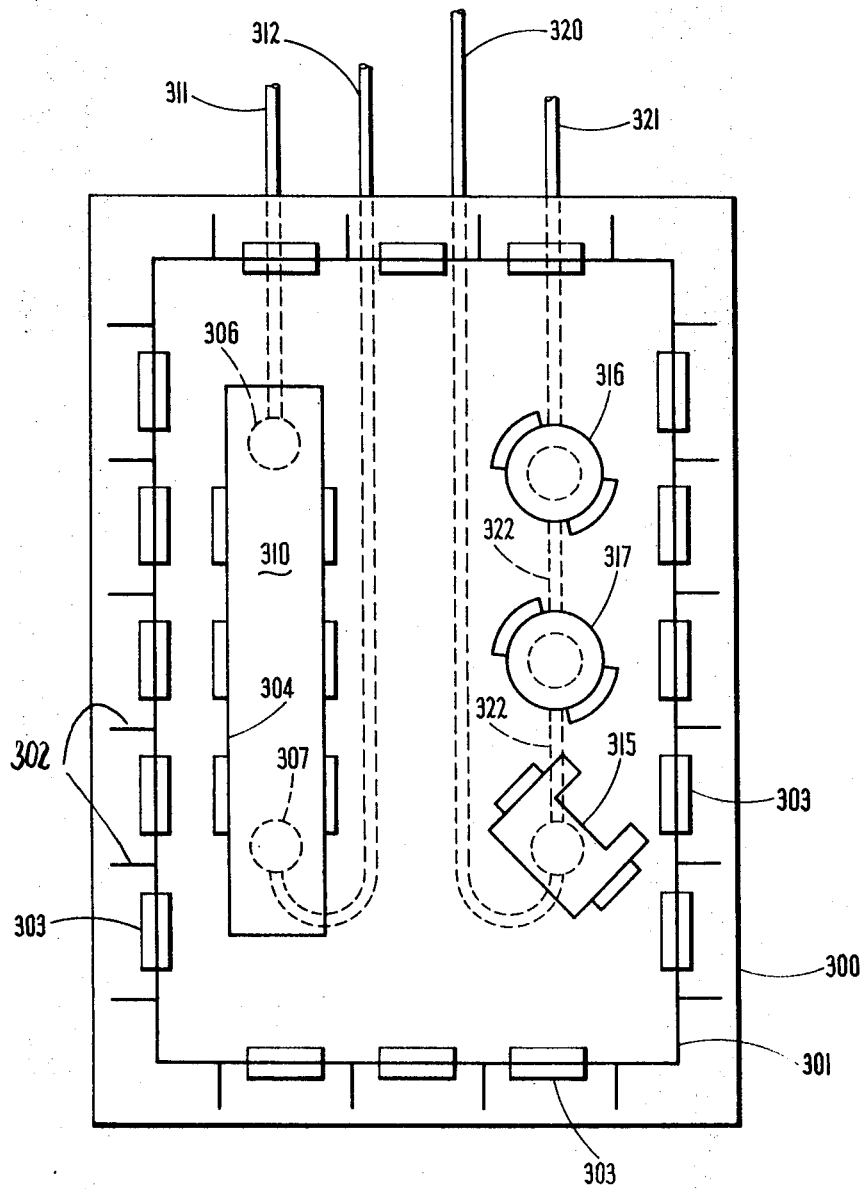
FIG. 7 is a somewhat schematic plan view of a die assembly made in accordance with the invention.

Referring to FIG. 7, there is illustrated a die assembly that illustrates some of the various features that may be incorporated in a particular embodiment of the invention. For example, the base 300 is provided with a continuous rule 301 that defines the outline of the workpiece. This may be formed and secured in a manner similar to rule 81. The segments 302 that radiate from rule 301 are designed to cut the peripheral waste into small pieces. These rules 302 and 301 may be conventionally bordered by rubber strippers 303. The internal waste that is stripped by the ejectors may in this instance take an elongated form defined by rule 304. Two ejectors 306 and 307 of the type previously described are secured to the base 300, also as previously described, at opposite ends of the rule 304. The tops of these ejectors are commonly secured to bridge 310, which functions to engage and eject the waste cut by the rule 304. Here two flexible tubes 311 and 312 extend respective from the ejectors 306 and 307, as previously descrbed. These tubes 311 and 312 may be provided with quick couplings at their free ends for engagement with an air source.

The ejector assemblies 315, 316 and 317 may be formed, as described earlier, and may be connected in series by air tubes 320, 321 and interconnecting segments 322.

What is claimed is:

1. In a cutting and creasing press having a frame with a uniform surface adapted to support a cutting die, a platen for pressing a workpiece against said cutting die, and articulating means for moving said platen and frame toward and away from each other, means for automatically stripping a work piece while in said press upon the cutting thereof by said cutting die, comprising said cutting die having a base with a major surface and a rule projecting from said major surface for severing a piece from said work piece, means for securing said cutting die to said frame, ejector means located inwardly of said platen and frame surface and projecting through said cutting die base, said ejector adapted to engage said piece and eject it from said rule, and means for actuating said ejector to eject said piece from said rule sequentially with the cutting of said work piece on said rule.

2. A device as set forth in claim 1 wherein said means for actuating said ejector includes means for ejecting said piece after said workpiece is removed from said rule.

3. A device as set forth in claim 1 including means for supporting said workpiece on said platen comprising guide means for engaging the edge of said work piece while on said platen when said platen is in an open position spaced from said cutting die, and means for moving said guide means upon engagement of said work piece with said cutting die.

4. A device as set forth in claim 7 including means for forcing said work piece from said platen subsequent to cutting said workpiece on said cutting die.

5. A device as set forth in claim 3 including means for rocking said platen about a horizontal axis to and away from said frame, said platen and frame defining a passage at the lower portions thereof when spaced apart for gravity feed of a die-cut work piece from said die, and said guide means includes a bottom guide, means supporting said bottom guide for lateral movement to and from a position for engaging a work piece and means for actuating said last mentioned means in synchronism with said rocking means.

6. In a cutting and creasing press having a frame adapted to support a cutting die, a platen for pressing a work piece against said die, means for rocking said platen about a horizontal axis to and away from said frame, said platen and frame defining a passage at the lower portions thereof when spaced apart whereby an unimpeded work piece may drop downwardly therebetween, guide means including a bottom guide means supporting said bottom guide for movement to and from a position of engagement with said work piece when on said platen and means for synchronizing the movement of said guide means from said position where said platen is in said pressing relation.

7. A conveyor system for a cutting and creasing and the like comprising at least one set of endless belt means each comprising a plurality of endless belts, rolls supporting said belts in spaced parallel relation, beater means having elements adapted to be periodically moved toward the spaces between said belts whereby articles carried by said belts having loosely attached portions moving over said belts may be impacted and said portions impelled through said spaces between said belts.

8. A conveyor system as set forth in claim 7 wherein said beater means includes a shaft having an axis extending laterally with respect to the direction of movement of the upper surfaces of said belt and supporting said elements for rotation about the axis of said shaft.

9. A conveyor system as set forth in claim 8 including a plurality of sets of endless belt means with one set spaced longitudinally with respect to the other and the respective belts of each set laterally offset one relative to the other and said elements comprise cams having surfaces eccentric with respect to said shaft axis.

10. A conveyor system as set forth in claim 9 wherein a plurality of cams are positioned on said shaft one each in alignment with each space between said belts.

11. A conveyor system as set forth in claim 10 wherein a plurality of said beater means are successively positioned over said belts.

12. A cutting die assembly for use in a cutting and creasing press comprising a base having opposed, parallel, major surfaces, a cutting rule having a cutting edge including at least a portion thereof for severing a segment from a work piece, means securing said rule to said base with the edge projecting outwardly from one of said surfaces, and means for sequentially separating said work piece and segment from said cutting die subsequent to said severing of said segment from said work piece, said means for sequentially separating includes a resilient, compressible member secured to said one surface of said base on one side of said portion of said rule for effecting a force in a direction outwardly of said one surface upon compression thereof by a work piece impaled upon said cutting die, means having elements on the other side of said portion of said rule for effecting a force in a direction outwardly of said one surface in time-synchronized relation to the effecting of said first-mentioned force.

13. A cutting die as set forth in claim 12 wherein said means having elements on the other side of said portion comprises a work piece engaging element, means supporting said work piece engaging element for movement in directions toward and away from said one surface, actuating means for moving said support means to effect a force in said direction away from said one surface on a work piece and control means for causing said actuating means to move after said resilient compressible member has effected a force on said work piece.

14. A cutting die as set forth in claim 13 wherein said actuating means includes a cylinder and piston with said cylinder secured to said base with said piston extending in a direction away from said one surface and engaging at said work piece engaging element at the end remote from said cylinder.

15. A cutting die as set forth in claim 14 wherein said actuating means includes tubes connected to said cylinder for conveying a pressure actuating medium to and from said cylinder, said base having recesses formed in the other of said surface to receive said tubes.

16. A cutting die as set forth in claim 15 wherein said control means comprises a valve connected to said tubes for controlling the flow of said pressure actuating medium therethrough, and cam means associated with said press for actuating said valve.

17. A cutting die assembly for use in a cutting and creasing press comprising a base having opposed, parallel, major surfaces, a cutting rule for cutting a segment from within a work piece, said segment being entirely bordered by said work piece, means securing said rule to said base with the edge of said rule projecting outwardly from one of said surfaces, means extending from between said parallel surfaces toward said one surface for ejecting said segment from within said rule subsequent to cutting of said segment from said work piece.

18. A cutting die assembly as set forth in claim 17 wherein said means for ejecting said segment includes means for ejecting said segment in timed sequence with respect to removal of said work piece from said rule.

19. A cutting die assembly as set forth in claim 18 including a plurality of said ejector means within the periphery of said rule and a bridge spanning and interconnecting said ejector means, said bridge adapted to engage said work piece.

20. A cutting die assembly as set forth in claim 18 wherein said edge of said rule is beveled on the side facing outwardly from said segment only.

21. A cutting die assembly as set forth in claim 18 wherein said ejector means are air actuated and a plurality of air tubes connect a plurality of said ejector means in series.

22. An ejector mechanism for use in a cutting die comprising a cylindrical casing adapted to be secured to the base of a cutting die, a piston positioned within said cylindrical casing and supported for coaxial movement with respect thereto, means for limiting said movement of said piston to and from a position wherein one end of said piston projects from one end of said casing and the other end of said piston is retained within said piston, means at said one end of said piston for engaging and supporting a member having laterally extending dimensions greater than those of said piston.

23. An ejector as set forth in claim 22 wherein said means at said one end of said piston for engaging a member that projects laterally beyond said piston comprises a threaded hole.

24. An ejector as set forth in claim 23 wherein said limting means includes means at said other end of said piston interengageable with means integral with said one end of said casing for retaining said piston and casing in sliding interengagement.

25. A ejector as set forth in claim 24 wherein said means at said other end of said piston includes an outwardly flared shoulder and said one end of said casing has an inwardly flared lip.

26. An ejector as set forth in claim 25 including an O-ring coaxial with and supported on said piston for sliding engagement with the inner surface of said casing.

27. An ejector as set forth in claim 22 wherein said limiting means includes a shaft extending axially from said other end of said piston with an outwardly flared flange at the end of said shaft remote from said piston, said plug having an axial slot to slidingly receive said shaft and means projecting inwardly of said axial slot to engage and restrain said outwardly flared flange.

28. An ejector as set forth in claim 22 wherein said means for engaging a member includes a threaded shank having one end extending into a tapped hole in said one end of said piston, said shank having its other end engaged with said member.

29. In a cutting and creasing press having a frame adapted to support a cutting die, a platen for pressing a workpiece against said die and means for moving said platen and frame toward and away from one another, the improvement comprising guide means for engaging and supporting a workpiece placed on said platen, means engaging said guide means for movement relative to said platen, and means operatively controlling said engaging means for synchronized movement of said guide means from engagement with workpiece placed upon said platen as said workpiece is engaged and pressed by said die.

30. In a cutting and creasing press as set forth in claim 29 including at least one angular member adapted to engage the bottom and said edge of a workpiece.

31. In a cutting and creasing press as set forth in claim 31 wherein said engaging means includes a fluid activated cylinder having a moveable member engaging said guide means.

32. In a cutting and creasing press as set forth in claim 31 wherein said platen is rockable from a generally horizontal position to an upwardly inclined position in which said workpiece is engaged by said cutting die, means securing said engageable means to the lower edge of said platen with said guide means positioned to be moved laterally on said platen toward the side edges thereof.

References Cited

UNITED STATES PATENTS

| 2,041,530 | 5/1936 | DeWitt et al. | 83—137X |
| 3,167,985 | 2/1965 | Madsen | 83—139 |
| 3,270,929 | 9/1966 | Foster | 93—36X |
| 3,303,979 | 2/1967 | Lang | 93—36X |

BERNARD STICKNEY, Primary Examiner

U.S. Cl. X.R.

83—137; 93—36A